(12) United States Patent
Lanteires

(10) Patent No.: US 7,694,663 B2
(45) Date of Patent: Apr. 13, 2010

(54) METHOD FOR CONTROLLING AN INTERNAL COMBUSTION ENGINE WITH THE AIM OF REDUCING THE POLLUTANT EMISSIONS, ENGINE OPERATING ACCORDING TO THIS METHOD, AND MOTOR VEHICLE EQUIPPED WITH SAID ENGINE

(75) Inventor: Fabien Lanteires, Paris (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 212 days.

(21) Appl. No.: 11/572,025

(22) PCT Filed: Jul. 4, 2005

(86) PCT No.: PCT/FR2005/050539

§ 371 (c)(1),
(2), (4) Date: Jan. 12, 2007

(87) PCT Pub. No.: WO2006/008416

PCT Pub. Date: Jan. 26, 2006

(65) Prior Publication Data

US 2008/0041340 A1 Feb. 21, 2008

(30) Foreign Application Priority Data

Jul. 12, 2004 (FR) .................... 04 07766

(51) Int. Cl.
*F02B 7/00* (2006.01)

(52) U.S. Cl. ............... 123/430; 123/316; 123/90.11; 123/90.22; 123/90.23; 123/90.15

(58) Field of Classification Search ............. 123/316, 123/90.1, 90.11, 90.22, 345, 346, 568.14, 123/430, 90.15
See application file for complete search history.

(56) References Cited

U.S. PATENT DOCUMENTS

| 2,344,933 | A | 3/1944 | Lysholm |
| 6,182,621 | B1 | 2/2001 | Salber et al. |
| 6,311,653 | B1 * | 11/2001 | Hamamoto ............. 123/90.11 |

(Continued)

FOREIGN PATENT DOCUMENTS

DE 19905636 A1 3/2000

OTHER PUBLICATIONS

International Search Report mailed Nov. 16, 2005 in PCT/FR2005/050539.

*Primary Examiner*—Michael Cuff
*Assistant Examiner*—Hung Q Nguyen
(74) *Attorney, Agent, or Firm*—Nicolas E. Seckel

(57) ABSTRACT

The invention concerns a method for controlling the operation of a cylinder assembly according to which the following phases are carried out during the same operating cycle: an exhaust opening phase ($L_1$); a first inlet opening phase ($L_2$) during a compression phase of the piston, and; a second inlet opening phase ($L_3$) subsequent to the first. The second inlet opening phase ($L_3$) begins once the piston reaches a position located in the second third of the travel thereof, in an expansion phase, and the first phase ($L_1$) is carried out entirely during the exhaust opening phase ($L_1$). The invention also concerns an internal combustion engine that operates according to the aforementioned method, and to a motor vehicle equipped with this engine.

12 Claims, 2 Drawing Sheets

U.S. PATENT DOCUMENTS

2002/0043243 A1* 4/2002 Majima ..................... 123/399
2003/0154964 A1* 8/2003 Gaessler et al. ........ 123/568.14
2006/0016421 A1* 1/2006 Kuo et al. ................... 123/299

* cited by examiner

METHOD FOR CONTROLLING AN INTERNAL COMBUSTION ENGINE WITH THE AIM OF REDUCING THE POLLUTANT EMISSIONS, ENGINE OPERATING ACCORDING TO THIS METHOD, AND MOTOR VEHICLE EQUIPPED WITH SAID ENGINE

BACKGROUND ART

The present invention concerns a method for controlling the operation of an internal combustion engine cylinder assembly, said cylinder assembly comprising a cylinder and an associated piston, defining together a combustion chamber, the piston being mounted slidingly in the cylinder between a bottom dead center position and a top dead center position, the combustion chamber being capable of being opened or closed at the intake, and opened or closed at the exhaust, method in which, during a same operating cycle, the following phases are performed:

an exhaust opening phase;
a first intake opening phase during a compression phase of the piston; and
a second intake opening phase subsequent to the first.

Such a control method is already known in the state of the art, in particular from document FR 2 796 418, and it aims generally at suppressing clicking sounds, without deteriorating the performance of the engine in a significant way.

SUMMARY OF THE INVENTION

An object of the invention is such a control method, making it possible to reduce importantly the emissions of pollutants constituted by the unburned residual hydrocarbons.

To this effect, in the control method according to the invention, the second intake opening phase starts once the piston reaches a position comprised in the second third of its course between its top dead center and its bottom dead center, in an expansion phase of the piston. The first intake opening phase is entirely performed during the exhaust opening phase.

Thanks to this arrangement, during the second intake opening phase, called "main" intake opening phase, the turbulence of the gases is increased in the combustion chamber, so that the quality of the combustion is increased, as well as the tolerance to the degradation of the ignition advance. As a consequence, the activation of the post-treatment systems, i.e., of the catalysts generally used to reduce the emissions of unburned hydrocarbons, is made quicker.

According to other characteristics of the method according to the invention:

the second intake opening phase starts once the piston reaches substantially its half-course position;
the first intake opening phase ends after the piston has reached its top dead center position, in the middle of the cycle.

Another object of the invention is an internal combustion engine having at least a cylinder assembly equipped with at least a cylinder and an associated piston defining together a combustion chamber, an intake valve and an exhaust valve, and control means driving said intake and exhaust valves so as to open or close the combustion chamber, at the intake and at the exhaust, respectively, characterized in that said control means drive the valves so as to perform a method as defined above.

Finally, another object of the invention is a motor vehicle comprising an internal combustion engine as defined above.

BRIEF DESCRIPTION OF THE DRAWINGS

A particular embodiment of the invention will now be described in reference to the Figures of the annexed drawings, in which.

DETAILED DESCRIPTION OF PARTICULAR EMBODIMENTS

Figure 1:
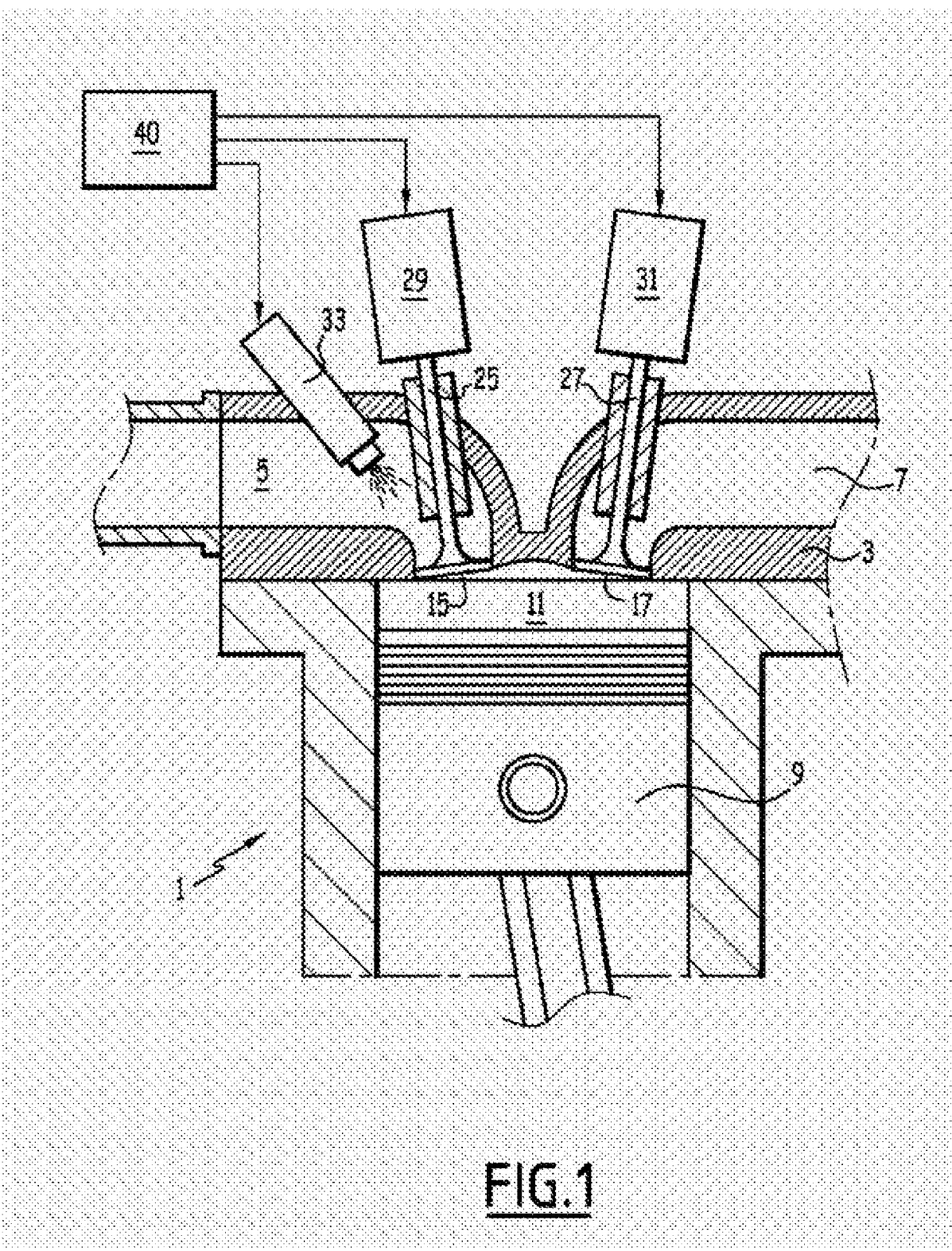
FIG. 1 is a partial schematic view in cross-section, in an axial plane, of a motor vehicle internal combustion engine cylinder assembly, of a type adapted to the implementation of a method according to the invention.

FIG. 1 shows in cross-section a portion (or cylinder assembly) of a motor vehicle internal combustion engine. This engine portion comprises essentially a cylinder 1, and a cylinder head 3 covering said cylinder, in which are formed, on the one hand, an intake conduit 5, and on the other hand, an exhaust conduit 7.

A piston 9, mounted slidingly inside the cylinder, delimits with the cylinder head 3 and the peripheral walls of the cylinder, a combustion chamber 11. The piston 9 is connected via a connecting rod to a crankshaft (not shown), whose angular position (in degrees) will be taken as reference value to follow the evolution of the operating cycles of the cylinder assembly.

The intake conduit 5 and the exhaust conduit 7 open into the combustion chamber 11, by an intake orifice 15 and an exhaust orifice 17, respectively.

The engine portion shown comprises additionally an intake valve 25 and an exhaust valve 27, associated to the cylinder 1, and controlled by respective actuators 29, 31, so as to close or open selectively the intake orifice 15 and the exhaust orifice 17, respectively.

The engine portion shown comprises additionally a fuel injector 33, arranged to inject fuel in an electronically controlled manner in the intake conduit 5.

The driving of the actuators 29, 31 and of the injector 33 is performed by an electronic monitoring and control unit 40. This electronic monitoring and control unit 40 also performs the ignition control in the combustion chamber 11, by means of a spark plug, not shown.

By reference to FIG. 2, a particular embodiment of the control method according to the invention will now be described. This method will be illustrated by a diagram showing the opening and closing phases of the intake and exhaust valves, over an operating cycle of the cylinder assembly.

Figure 2:
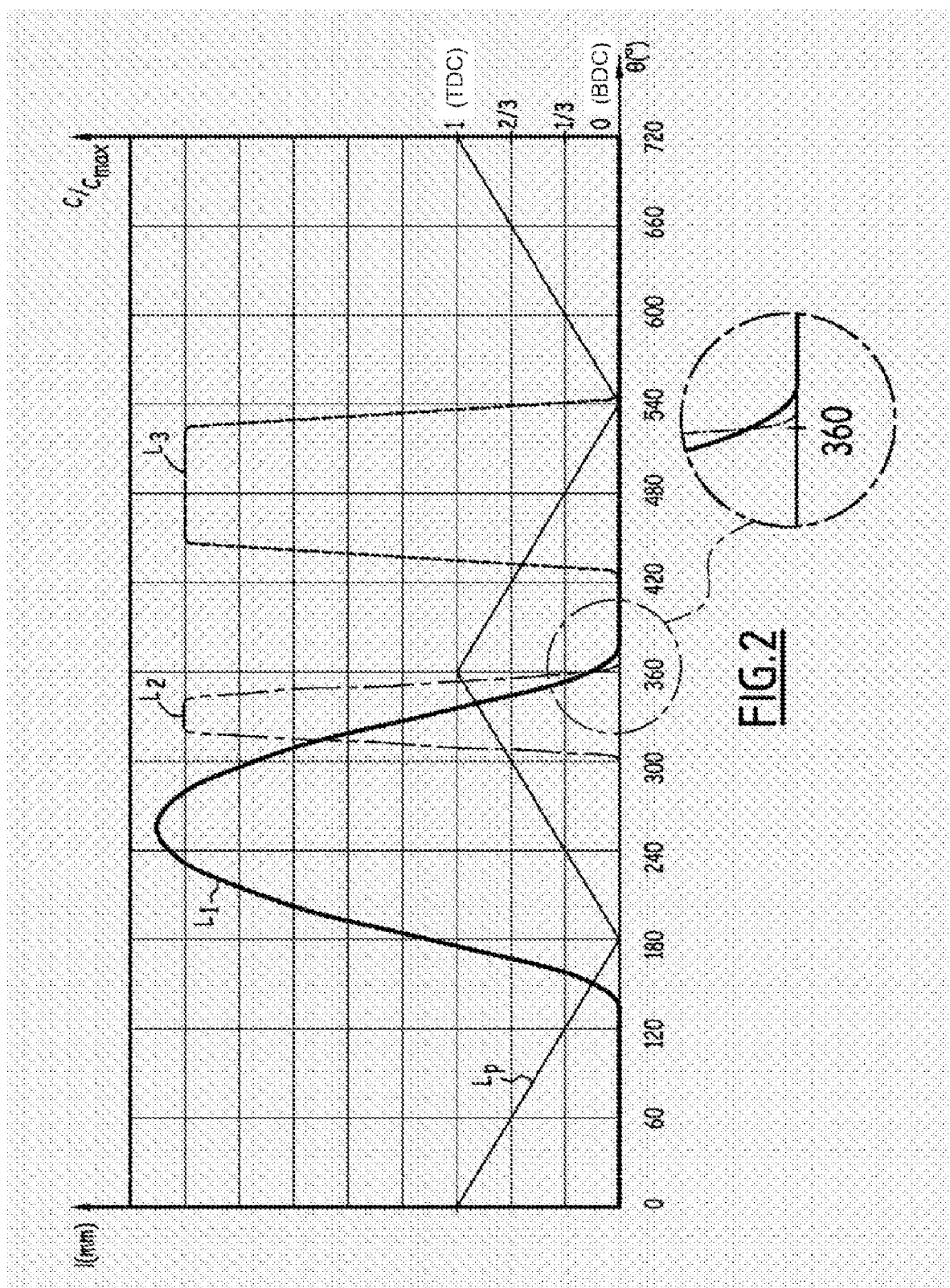
FIG. 2 is a diagram representative of the stroke of the exhaust and intake valves, as a function of the angular position of the crankshaft.

On the diagram of FIG. 2, the curves $L_1$, $L_2$, $L_3$ of the strokes of the valves 25, 27 have been indicated as a function of the angular position of the crankshaft (or "crankshaft-angle").

The crankshaft-angle θ (expressed in degrees) is indicated on the abscissa axis, and the amplitude of the stroke of the valves 1 expressed, for example, in mm) is indicated on the ordinates axis.

The reference 0 of the crankshaft-angle is taken by hypothesis in correspondence with a top dead center (TDC) position of the piston 9, and with the start of the cycle.

An operating cycle of the cylinder, in the illustrated example, is performed over two crankshaft revolutions, between the angles 0 and 720°.

On the diagram of FIG. 2, the curve $L_P$, representative of the axial position of the piston 9 as a function of the crankshaft-angle θ, has also been indicated according to a second ordinate axis. On this ordinate axis, the ratio of the stroke C of the piston by the total stroke $C_{max}$ between its bottom dead center (BDC) and its top dead center (TDC), the value 0 corresponding to the bottom dead center (BDC) position, and the value 1 corresponding to the top dead center (TDC) position, have been indicated.

By convention, a compression phase of the piston, i.e., a phase of movement of the piston 9 from its bottom dead center position toward its top dead center position, will be called "ascending" phase. Conversely, an expansion phase, i.e., a phase of movement of the piston from its top dead center position toward its bottom dead center position, will be called "descending" phase.

In the embodiment illustrated, the operating cycle of the cylinder comprises in the first instance an exhaust opening phase, characterized by the exhaust valve stroke curve $L_1$.

This exhaust phase starts toward the end of the first descending phase, i.e., between 120° and 180° crankshaft angle, and more precisely in the vicinity of 150° crankshaft angle. This exhaust opening phase ends at the start of the following descending phase, i.e., between 360° and 420° crankshaft angle, and more precisely, between 360° and 380° crankshaft angle.

This exhaust opening phase enables the evacuation of the combustion gases, produced during the preceding cycle and contained in the combustion chamber.

The operating cycle comprises additionally a first intake opening phase, called "pilot intake opening," which is shown by the curve $L_2$.

This pilot intake phase starts during the exhaust opening phase, more precisely during the first ascending phase of the piston, and still more precisely, in the example shown, at about 300° crankshaft angle.

This pilot intake phase ends between the passage of the piston at the top dead center of this first ascending phase, i.e., toward the middle of the cycle, and the end of the exhaust phase.

Thus, the intake pilot phase ends between 360° and 380° crankshaft angle, preferably at a value of the crankshaft angle substantially equal to 360°.

The cycle comprises additionally a second intake opening phase, called "main intake phase," shown by the curve $L_3$.

This phase starts at a crankshaft angle corresponding to the passage of the piston at a position comprised in the second third of its total course, i.e., between 420° and 480° crankshaft angle. Preferably, the start of the main intake phase corresponds substantially to the passage of the piston at its half-course position (450° crankshaft angle) in the second descending phase.

The end of the main intake phase is designed to coincide substantially with the passage of the piston at its bottom dead center, at the end of the second descending phase, i.e., with a crankshaft angle of about 540°.

Naturally, the cycle comprises a fuel injection phase during the main intake phase, but the characteristics of this injection phase have not been indicated on the diagram, and will not be explicited here.

The interference between the exhaust opening phase and the pilot intake phase makes it possible to push back the exhaust gases into the intake conduit.

The largest portion of these gases remains trapped in the intake conduit, and, as a result of their high temperature, warms up the walls of the conduit, and improves the quality of the air-fuel mixture, in particular by vaporization of the fuel deposited on the walls of the conduit, in the case of indirect injection engines.

The fact of initiating the main intake phase in the vicinity of the half-course position of the piston makes it possible to optimize the turbulence level of the gases inside the combustion chamber, while taking advantage of a piston speed that is maximal or close to its maximal value.

Thus, the instabilities of the engine are reduced.

It will be noted that the precocity of the end of the pilot intake phase, i.e., before the end of the exhaust phase, coupled with the late start (close to the half-course of the piston in descending phase) of the main intake phase, makes it possible to create the desired aerodynamic turbulence effect inside the combustion chamber, after re-aspiration of the burned gases.

Such an improvement of the operation of the engine can be obtained by simple means, and in particular, with a single intake valve for each cylinder. However, it could be envisioned to reach the same result with two distinct intake valves, one performing the pilot stroke, and the other performing the main intake stroke.

The invention claimed is:

1. A method for controlling the operation of an internal combustion engine cylinder assembly, said cylinder assembly comprising a cylinder and an associated piston, defining together a combustion chamber, the piston being mounted slidingly in the cylinder between a bottom dead center position and a top dead center position, the combustion chamber being capable of being opened or closed at the intake by an intake valve, and opened or closed at the exhaust by an exhaust valve, wherein the method comprises, during a same operating cycle:

performing an exhaust opening phase;

performing a first intake opening phase during a compression phase of the piston, wherein a first valve stroke during the first intake opening phase has a first amplitude; and performing a second intake opening phase subsequent to the first intake opening phase, wherein a second valve stroke during the second intake opening phase has a second amplitude substantially equal to the first amplitude;

wherein the second intake opening phase starts at a crankshaft angle from 420 to 480 degrees, in an expansion phase of the piston, and in that the first intake opening phase is entirely performed during the exhaust opening phase;

wherein the first intake opening phase ends between the passage of the piston at the top dead center of a first ascending and an end of the exhaust opening phase;

wherein the first intake opening phase ends at substantially 360 degrees crankshaft angle; and wherein the first intake opening phase starts at about 300 degrees crankshaft angle.

2. The method according to claim 1, wherein the second intake opening phase staffs once the piston reaches substantially its half-course position.

3. The method according to claim 1, wherein the first intake opening phase ends after the piston has reached its top dead center position, in the middle of the cycle.

4. An internal combustion engine having at least a cylinder assembly equipped with at least a cylinder and an associated piston defining together a combustion chamber, an intake valve and an exhaust valve, and control means driving said intake and exhaust valves so as to open or close the combustion chamber, at the intake and at the exhaust, respectively, wherein said control means drive the valves so that, during a same operating cycle, the following phases are performed:

an exhaust opening phase;

a first intake opening phase during a compression phase of the piston, wherein a first valve stroke during the first intake opening phase has a first amplitude; and a second intake opening phase subsequent to the first intake opening phase, wherein a second valve stroke during the second intake opening phase has a second amplitude substantially equal to the first amplitude;

wherein the second intake opening phase starts at a crankshaft angle from 420 to 480 degrees, in an expansion phase of the piston, and in that the first intake opening phase is entirely performed during the exhaust opening phase;

wherein the first intake opening phase ends between the passage of the piston at the top dead center of a first ascending phase and an end of the exhaust phase;

wherein the first intake opening phase ends at substantially 360 degrees crankshaft angle; and wherein the first intake opening phase starts at about 300 degrees crankshaft angle.

5. A motor vehicle comprising the internal combustion engine according to claim 4.

6. The internal combustion engine according to claim 4, wherein said control means drive the valves so that, during the same operating cycle, the second intake opening phase starts once the piston reaches substantially its half-course position.

7. A motor vehicle comprising the internal combustion engine according to claim 6.

8. The internal combustion engine according to claim 4, wherein said control means drive the valves so that, during the same operating cycle, the first intake opening phase ends after the piston has reached its top dead center position, in the middle of the cycle.

9. A motor vehicle comprising the internal combustion engine according to claim 8.

10. The method according to claim 2, wherein the first intake opening phase ends after the piston has reached its top dead center position, in the middle of the cycle.

11. The internal combustion engine according to claim 6, wherein said control means drive the valves so that, during the same operating cycle, the first intake opening phase ends after the piston has reached its top dead center position, in the middle of the cycle.

12. A motor vehicle comprising the internal combustion engine according to claim 10.

* * * * *